US010399408B2

(12) United States Patent
Heil et al.

(10) Patent No.: US 10,399,408 B2
(45) Date of Patent: Sep. 3, 2019

(54) METHOD FOR CONTROLLING AND/OR REGULATING THE EVAPORATOR TEMPERATURE OF AN AIR CONDITIONING SYSTEM IN A MOTOR VEHICLE

(75) Inventors: Michael Heil, Forstinning (DE); Mattias Bruce, Munich (DE); Robert Salzberger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 967 days.

(21) Appl. No.: 12/512,669

(22) Filed: Jul. 30, 2009

(65) Prior Publication Data
US 2009/0301111 A1    Dec. 10, 2009

Related U.S. Application Data

(63) Continuation of application No. PCT/EP2008/000828, filed on Feb. 1, 2008.

(30) Foreign Application Priority Data

Feb. 15, 2007    (DE) ........................ 10 2007 007 440

(51) Int. Cl.
*B60H 1/00*    (2006.01)
*B60H 3/02*    (2006.01)
*B60H 1/32*    (2006.01)

(52) U.S. Cl.
CPC ......... *B60H 1/00785* (2013.01); *B60H 3/024* (2013.01); *B60H 2001/328* (2013.01)

(58) Field of Classification Search
CPC .. F24F 3/1405; F24F 11/0015; F24F 11/0012; F24F 3/153; F24F 3/14;
(Continued)

(56) References Cited

U.S. PATENT DOCUMENTS 2,249,856 A * 7/1941 Ruff ................................. 62/95
3,007,320 A * 11/1961 Henkel .......................... 62/126
(Continued)

FOREIGN PATENT DOCUMENTS

DE    37 24 430 A1    2/1989
DE    422 38 364 A1    5/1994
(Continued)

OTHER PUBLICATIONS

Sughiura, JP62178420TRANS (English Translation), Aug. 1987.*
(Continued)

*Primary Examiner* — Eric S Ruppert
(74) *Attorney, Agent, or Firm* — Crowell & Moring LLP

(57) ABSTRACT

A method and apparatus controls and/or regulates the evaporator temperature of an air conditioning system in a motor vehicle in cooling mode. When an outside air temperature exceeds a predetermined limit value, the evaporator temperature is controlled and/or regulated to a predetermined minimum evaporator temperature until a predetermined desired temperature in the interior of the vehicle is reached. After reaching the predetermined desired temperature in the interior of the vehicle, the evaporator temperature is increased until a predetermined interior humidity in the vehicle is reached, or the interior temperature is higher than the predetermined desired temperature for the interior of the vehicle.

20 Claims, 1 Drawing Sheet

(58) Field of Classification Search
CPC ......... F24F 2011/0013; B60H 1/00785; B60H 1/3207; B60H 2001/3245; B60H 1/3211
USPC ............. 62/91, 176.1, 176.6, 186, 244, 151; 236/44 R, 44 A
See application file for complete search history.

(56) References Cited

U.S. PATENT DOCUMENTS

| | | | | |
|---|---|---|---|---|
| 3,989,097 | A | * | 11/1976 | Schildknecht ........... F24F 11/02 165/228 |
| 5,065,593 | A | * | 11/1991 | Dudley et al. ................... 62/182 |
| 5,531,801 | A | * | 7/1996 | Sewell et al. .................... 96/240 |
| 5,549,153 | A | | 8/1996 | Baruschke et al. |
| 5,632,156 | A | | 5/1997 | Takeo et al. |
| 6,029,466 | A | | 2/2000 | Wieszt |
| 6,269,650 | B1 | * | 8/2001 | Shaw ............................ 62/176.6 |
| 6,330,909 | B1 | * | 12/2001 | Takahashi et al. ............ 165/202 |
| 6,334,325 | B1 | | 1/2002 | Herpel et al. |
| 2002/0002633 | A1 | | 1/2002 | Klapp et al. |
| 2002/0166331 | A1 | * | 11/2002 | Park et al. ........................ 62/151 |
| 2003/0209022 | A1 | * | 11/2003 | Ieda et al. ........................ 62/244 |
| 2007/0235549 | A1 | * | 10/2007 | Nakajima ................... 236/44 R |
| 2009/0301111 | A1 | | 12/2009 | Heil et al. |

FOREIGN PATENT DOCUMENTS

| | | | |
|---|---|---|---|
| DE | 197 28 578 | A1 | 2/1999 |
| DE | 199 64 398 | B4 | 3/2006 |
| EP | 0 919 410 | A2 | 6/1999 |
| EP | 1 134 516 | A2 | 9/2001 |
| EP | 1 285 788 | A2 | 2/2003 |
| JP | 57144119 | * | 9/1982 |
| JP | 62178420 | * | 8/1987 |
| JP | 2002192933 | * | 7/2002 |
| WO | WO 2008/098892 | A1 | 8/2008 |

OTHER PUBLICATIONS

Yamashita, JP2002192933TRANS (English Translation), Jul. 2002.*
Matayoshi, JP57144119HT (English Translation) (Year: 1982).*
European Office Action dated Dec. 2, 2009 with English translation (six (6) pages).
German Search Report dated Jul. 18, 2007 including partial English translation (Nine (9) pages).
International Search Report dated May 28, 2008 including English translation (Six (6) pages).

* cited by examiner

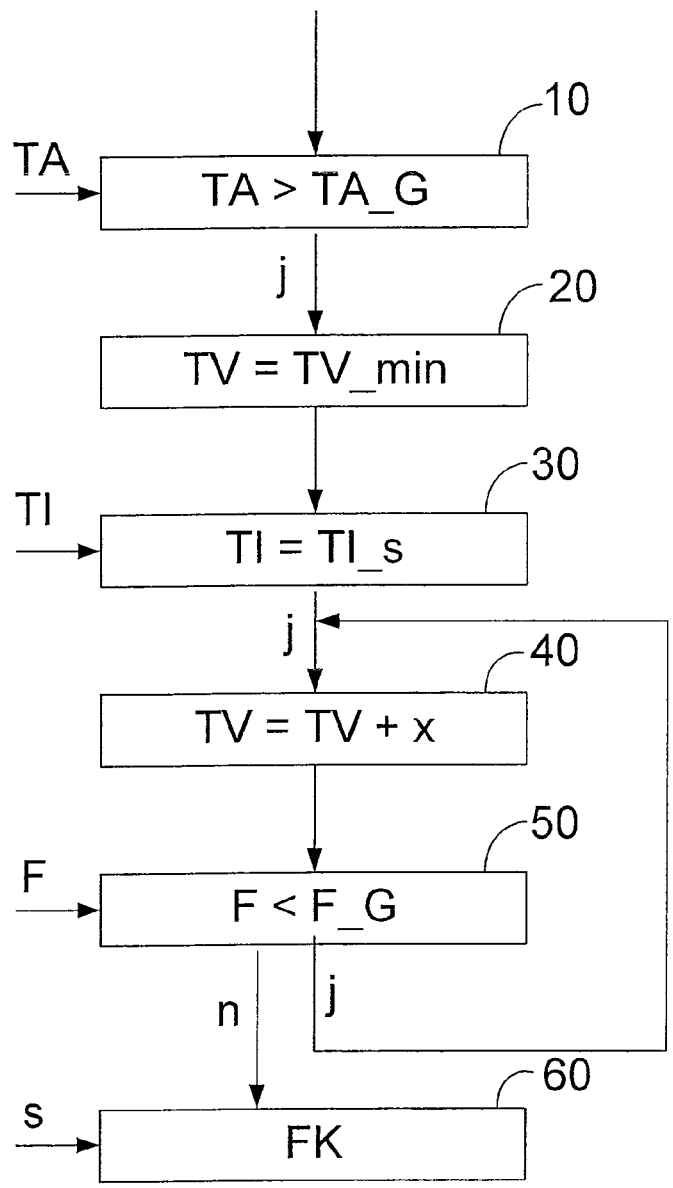
Fig.

METHOD FOR CONTROLLING AND/OR REGULATING THE EVAPORATOR TEMPERATURE OF AN AIR CONDITIONING SYSTEM IN A MOTOR VEHICLE

CROSS-REFERENCE TO RELATED APPLICATIONS

This application is a continuation of PCT International Application No. PCT/EP2008/000828, filed Feb. 1, 2008, which claims priority under 35 U.S.C. § 119 to German Patent Application No. DE 10 2007 007 440.0, filed Feb. 15, 2007, the entire disclosures of which are herein expressly incorporated by reference.

BACKGROUND AND SUMMARY OF THE INVENTION

The invention relates to a method for controlling and/or regulating the evaporator temperature of an air conditioning system in a motor vehicle at high outside air temperatures, and to a control unit for carrying out the method.

Currently, the evaporator temperature of an air conditioning system in the motor vehicle is usually controlled or regulated as a function of the outside air temperature, the set value of the ventilation system, and the blower fan voltage. At the same time, critical condensation situations are also taken into consideration so that the driver always has a good view through the window panes.

In this context, air conditioning systems of this type may be run in two different operating modes for the cooling mode. In the first operating mode, the evaporator temperature is controlled by suitably adjusting the compressor capacity such that the temperature of the air, guided over the evaporator, is not decreased to the potential minimum value. Rather, an evaporator temperature that is higher as a function of the outside air temperature is selected. During this operating mode there is only a reduced air drying process so that it is possible for condensation to build-up on the window panes in the vehicle.

In contrast to the first operating mode, the evaporator temperature in the second operating mode is decreased to a minimum allowable evaporator temperature that just barely exceeds the freezing point. In both cases, the extremely cooled air can be reheated again by way of a downstream heating element for the purpose of reaching and/or holding the predetermined desired temperature in the ventilation system and in the interior of the vehicle. The air, flowing into the interior of the vehicle, is thus very dry owing to the decrease in temperature, caused by the very low evaporator temperature and the potential subsequent increase in temperature, a situation that the driver perceives as unpleasant and uncomfortable (for example, mucous membranes in the nasal and mouth cavity dry out). Moreover, energy is needed to greatly decrease the temperature as far down as the vicinity of the 0° C. limit and, at the same time, to thereby concomitantly dehumidify the air and perhaps to subsequently increase the temperature of the air.

An air conditioning system of the above-mentioned type is disclosed, for example, in DE 37 24 430 A1. In this case, both aforementioned operating modes are used as a function of the outside air temperature and the desired temperature for the interior of the vehicle. The purpose is to achieve a good dehumidifying effect with a relatively low consumption of energy.

In order to guarantee an initial fast and adequate cooling of the interior of the vehicle when the outside air temperature is very high, for example, over 30° C., the evaporator temperature is usually controlled or regulated to a predetermined minimum evaporator temperature in the vicinity of the freezing point (cf. also FIG. 2 in DE 37 24 430 A1). This technique leads, owing to the evaporator temperature in the vicinity of the freezing point with high dehumidifying capacity, to physiologically too low relative humidity in the passenger compartment.

In order to hold the predetermined desired temperature after the temperature of the interior of the vehicle has been rapidly decreased in a first step, the air, which has been very greatly cooled by the evaporator, is then reheated again to some extent by use of the heat exchanger. This technique leads to very dry inside air and, additionally, to an increased consumption of fuel.

The object of the invention is to provide a method that is improved with respect to the fuel consumption and the purpose of which is to control and/or regulate the evaporator temperature of an air conditioning system in a vehicle at high outside air temperatures.

This and other objects are achieved by a method and a control unit for controlling and/or regulating the evaporator temperature of an air conditioning system in a motor vehicle in the cooling mode, during which at an outside air temperature, which exceeds a predetermined limit value, the evaporator temperature is controlled and/or regulated to a predetermined minimum evaporator temperature until a predetermined desired temperature in the interior of the vehicle is reached. After reaching the predetermined desired temperature in the interior of the vehicle, the evaporator temperature is increased until a predetermined interior humidity in the vehicle is reached or until the interior temperature is higher than the predetermined desired temperature for the interior of the vehicle. Advantageous further developments are disclosed herein.

One aspect of the invention is to additionally regulate the evaporator temperature as a function of the demand, by way of the correcting variable for the interior temperature control system. When the outside air temperature is very high, thus, outside air temperatures that exceed a predetermined limit value, the inventive method for controlling and/or regulating the evaporator temperature of an air conditioning system in a motor vehicle in cooling mode initially controls or regulates the evaporator temperature, according to the technique known in the prior art, to a predetermined minimum evaporator temperature until a predetermined desired temperature in the interior of the vehicle and/or until a steady state temperature is reached. Then, on and/or after reaching the desired temperature for the interior of the vehicle, the evaporator temperature is increased until a predetermined humidity inside the vehicle is reached or the temperature in the interior is higher than the predetermined desired temperature for the interior of the vehicle. During this phase of the method, a heat exchanger can be used independently for heating the air.

Increasing the evaporator temperature step-by-step causes, on the one hand, the humidity in the interior of the vehicle to rise again and, at the same time, the fuel consumption is reduced. In this way it is possible to realize a reduction in the use of energy as compared to conventional methods. Even the emission of carbon dioxide is drastically reduced.

It is advantageous to specify, as the interior humidity, an interior humidity range, which is perceived by the occupants of the vehicle as pleasant. Thus, the evaporator temperature is raised until an interior humidity in the vehicle prevails that lies within this predetermined interior humidity range. As soon as the upper limit of this interior humidity range is reached, the evaporator temperature can be held either at this level or is changed only by the amount that is necessary for holding the desired temperature and/or the interior humidity of the interior of the vehicle without activating the heat exchanger.

It is advantageous for the interior humidity, prevailing in the vehicle, to be determined as a function of the signal of a condensation sensor and/or a humidity sensor, since condensation sensors and/or humidity sensors already exist in newer vehicles. In principle, condensation sensors are used only to detect condensate on the window panes of the vehicle. Thus, condensate is detected when the sensor exceeds a defined desired value (for example, 60% humidity). Since the condensation sensor signal changes smoothly as a function of the humidity, this signal can also be used at low humidity as a measure for the interior humidity and can be evaluated. Thus, it is possible to define a comfortable interior humidity range as that range in which the signal of the condensation sensor outputs a humidity ranging from 20% to 30%. This interior humidity range is perceived by most people to be comfortable.

When, owing to the gradual increase in the evaporator temperature, the predetermined interior humidity and/or the upper limit of the predetermined interior humidity range is reached, the opening of the fresh air flaps of the motor vehicle is throttled advantageously as a function of the signal of the condensation sensor (especially effective at higher outside air humidity). This targeted throttling of the opening of the fresh air flaps makes it possible, in addition and/or furthermore, to save fuel at the maximum high evaporator temperature, since the evaporator temperature does not have to be lowered again. Only if these measures do not result in the desired success does the evaporator temperature have to be lowered again in order to reach and/or hold the predetermined interior humidity.

In an advantageous embodiment of the invention, the signal of a solar sensor can also be evaluated, in order to enable optimal control and/or regulation of the evaporator temperature at high outside air temperatures. A high direct solar load from the front and/or from the side has to be responded to with a lowering of the evaporator temperature and an increase in the quantity of air issuing directly from the nozzles of the ventilation system. This additional solar sensor signal can be used for regulating the evaporator temperature. The evaporator temperature can be lowered or raised as a function of the radiation load (cloudy sky and/or darkness-night).

The inventive method can be implemented in a control unit for controlling and/or regulating the evaporator temperature and/or the entire air conditioning system.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE shows a simplified flow chart of the method for controlling the evaporator temperature of an air conditioning system in cooling mode at high outside air temperatures.

DETAILED DESCRIPTION OF THE DRAWING

Referring to the embodiment shown in the FIGURE, at the start of the method for controlling and/or regulating the evaporator temperature of an air conditioning system in a motor vehicle at high outside air temperatures, it is determined in a step 10 whether the outside air temperature TA exceeds a high outside air temperature limit value TA_G of, for example, 30° C. If this is the case, then one proceeds to step 20. At this stage, the evaporator temperature TV is adjusted down to a minimum evaporator temperature TV_min, which lies just barely above the freezing point. The next step 30 checks whether the determined temperature T in the interior of the vehicle has reached the predetermined desired temperature $T1\_s$ for the interior of the vehicle. As soon as the predetermined desired temperature $T1\_s$ for the interior of the vehicle has been reached, the evaporator temperature TV in the next step 40 is no longer regulated to the minimum evaporator temperature TV_min. Rather, at this stage, the evaporator temperature TV is increased step-by-step by an amount x. After each increase in the evaporator temperature TV by the amount x, step 50 compares the interior humidity F, determined from the signal of a condensation sensor, with a predetermined interior humidity limit value F_G, which can also be an interior humidity range. As long as the determined interior humidity F is still less than the predetermined interior humidity limit value F_G, the process returns to step 40 and continues to increase the evaporator temperature TV.

When the determined interior humidity F reaches or exceeds the predetermined interior humidity limit value F_G and/or the upper limit of the predetermined interior humidity range, one proceeds to step 60, and the opening of the fresh air flaps FK of the motor vehicle is throttled as a function of the determined interior humidity and/or the signal s of the condensation sensor. As a result of this targeted throttling of the fresh air flaps FK, it is possible to save, additionally and/or furthermore, fuel at the maximum high evaporator temperature TV, which is set at this point-in-time, because the evaporator temperature TV does not have to be lowered again.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for controlling and/or regulating an evaporator temperature of an air conditioning system in a motor vehicle in a cooling mode, the method comprising the acts of:
   detecting that an outside air temperature exceeds a predetermined limit value;
   controlling and/or regulating the evaporator temperature, in response to detecting that the outside air temperature exceeds the predetermined limit value, to a predetermined minimum evaporator temperature until a predetermined desired temperature in an interior of the vehicle is reached; and
   detecting that the predetermined desired temperature in the interior of the vehicle has been reached;
   incrementally increasing, in response to only said detecting that the predetermined desired temperature in the interior of the vehicle has been reached, the evaporator temperature from the predetermined minimum evaporator temperature until the earlier of: (i) a predetermined interior humidity in the vehicle is reached, and

(ii) the interior temperature is higher than the predetermined desired temperature for the interior of the vehicle.

2. The method according to claim 1, wherein the predetermined interior humidity in the vehicle is an interior humidity range known to be comfortable for occupants of the vehicle.

3. The method according to claim 1, wherein the interior humidity is determined as a function of one or more signals from at least one of a condensation sensor and a humidity sensor.

4. The method according to claim 2, wherein the interior humidity is determined as a function of one or more signals from at least one of a condensation sensor and a humidity sensor.

5. The method according to claim 1, wherein upon reaching the predetermined interior humidity, an opening of fresh air flaps of the motor vehicle is throttled.

6. The method according to claim 2, wherein upon reaching an upper limit of the interior humidity range, an opening of fresh air flaps of the motor vehicle is throttled.

7. The method according to claim 3, wherein upon reaching the predetermined interior humidity, an opening of fresh air flaps of the motor vehicle is throttled.

8. The method according to claim 3, wherein upon reaching an upper limit of the interior humidity range, an opening of fresh air flaps of the motor vehicle is throttled.

9. The method according to claim 1, further comprising the act of utilizing additionally a signal of a solar sensor for controlling and/or regulating the evaporator temperature.

10. The method according to claim 7, further comprising the act of utilizing additionally a signal of a solar sensor for controlling and/or regulating the evaporator temperature.

11. The method according to claim 8, further comprising the act of utilizing additionally a signal of a solar sensor for controlling and/or regulating the evaporator temperature.

12. The method according to claim 5, further comprising, in the event said throttling of the opening of fresh air flaps of the motor vehicle fails to cause the predetermined interior humidity to be held, lowering the evaporator temperature.

13. The method according to claim 1, wherein after each incremental increase of the evaporator temperature, the method further comprises comparing an interior humidity with the predetermined interior humidity.

14. An apparatus for controlling and/or regulating an evaporator temperature of an air conditioning system in a motor vehicle in a cooling mode, comprising:

a controller operatively configured to:

detect that an outside air temperature exceeds a predetermined limit value;

control and/or regulate an evaporator temperature to a predetermined minimum evaporator temperature until a predetermined desired temperature is reached inside the vehicle when the outside air temperature is detected as exceeding the predetermined limit value; and detect that the predetermined desired temperature in the interior of the vehicle has been reached;

incrementally increase the evaporator temperature, in response to only detecting that the predetermined desired temperature in the interior of the vehicle has been reached, from the predetermined minimum evaporator temperature, until the earlier of a predetermined interior humidity in the vehicle is reached and an interior temperature becomes higher than a predetermined desired temperature for the interior of the vehicle.

15. The apparatus according to claim 14, wherein the interior humidity is an interior humidity range known to be comfortable for vehicle occupants.

16. The apparatus according to claim 14, further comprising at least one of a condensation sensor and humidity sensor, said at least one sensor providing a signal for determining the interior humidity.

17. The apparatus according to claim 16, further comprising a solar sensor providing an additional signal to the controller for assistance in controlling and/or regulating the evaporator temperature.

18. The apparatus according to claim 14, wherein the controller is further operatively configured to throttle an opening of fresh air flaps of the motor vehicle upon reaching the predetermined interior humidity.

19. The apparatus according to claim 18, wherein, in the event the throttling of the opening of fresh air flaps of the motor vehicle fails to cause the predetermined interior humidity to be held, the controller is further operatively configured to lower the evaporator temperature.

20. The apparatus according to claim 14, wherein after each incremental increase of the evaporator temperature, an interior humidity is compared with the predetermined interior humidity.

\* \* \* \* \*